July 4, 1961
J. C. BLAND
2,990,893
LAND LEVELLING AND SMOOTHING HARROW
Filed Oct. 5, 1959
2 Sheets-Sheet 1
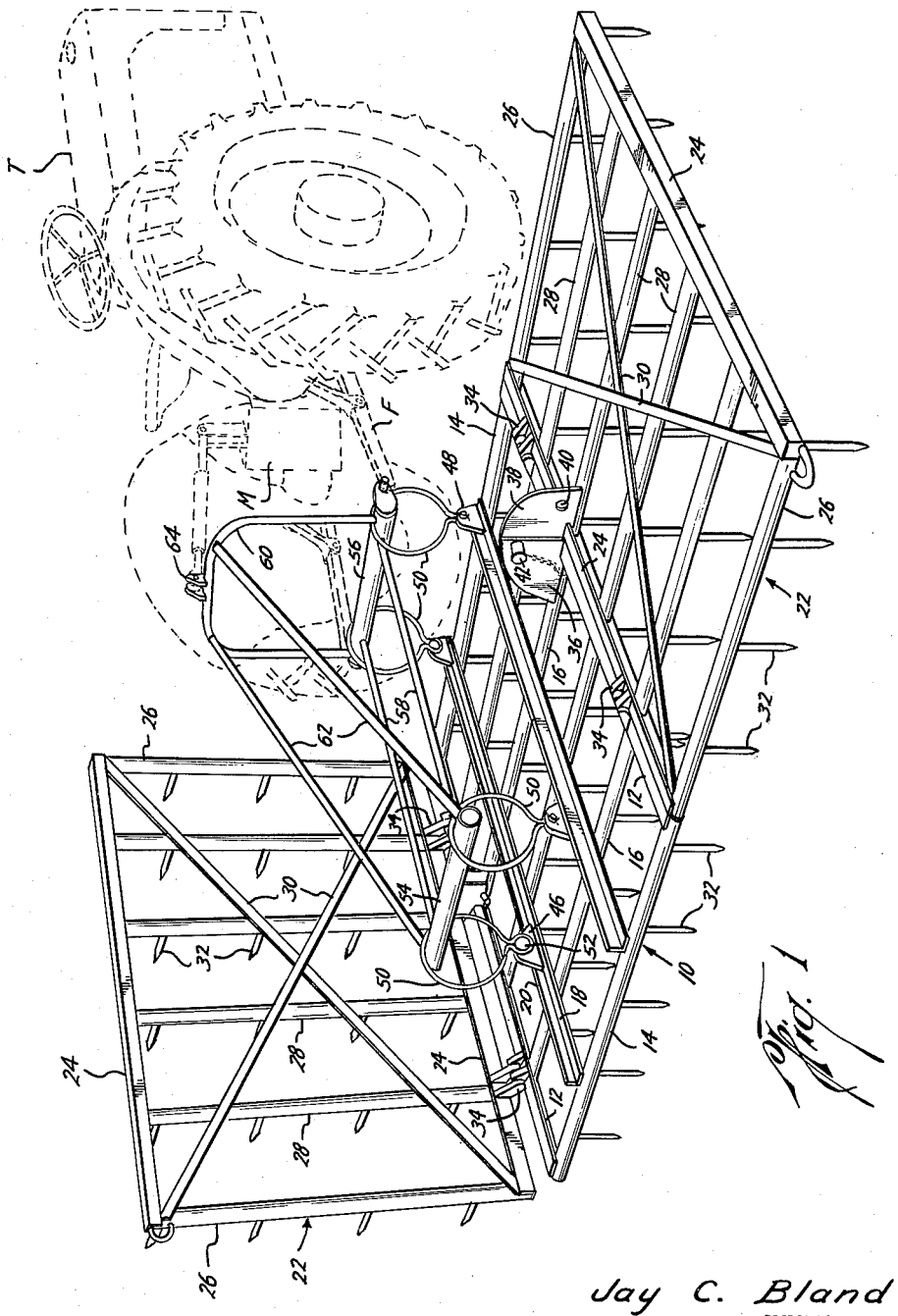
Jay C. Bland
INVENTOR.
BY
Charles E. Lightfoot
ATTORNEY July 4, 1961
J. C. BLAND
2,990,893
LAND LEVELLING AND SMOOTHING HARROW
Filed Oct. 5, 1959
2 Sheets-Sheet 2
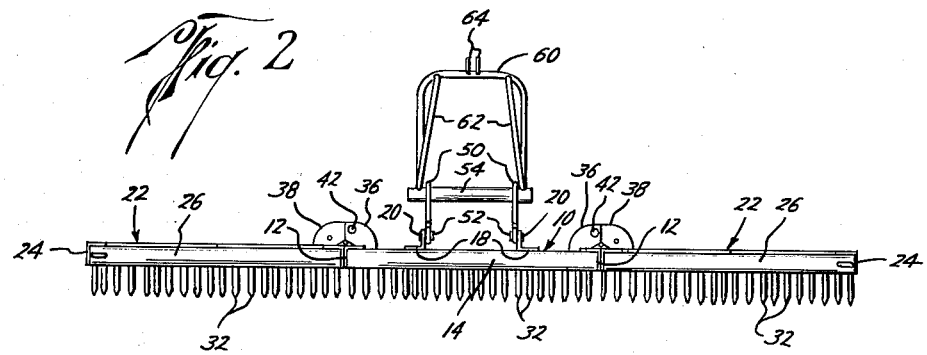
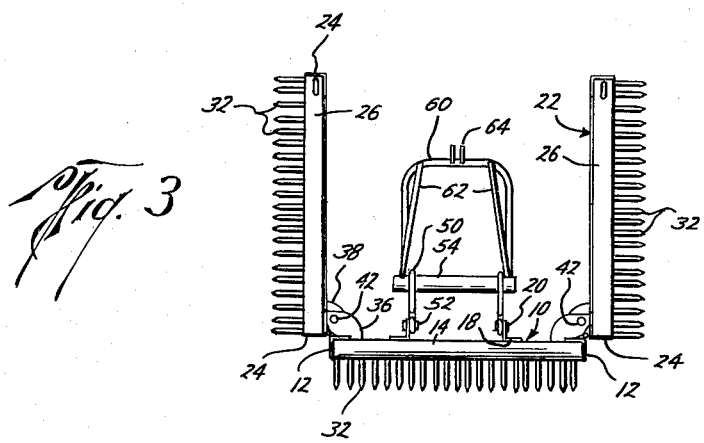
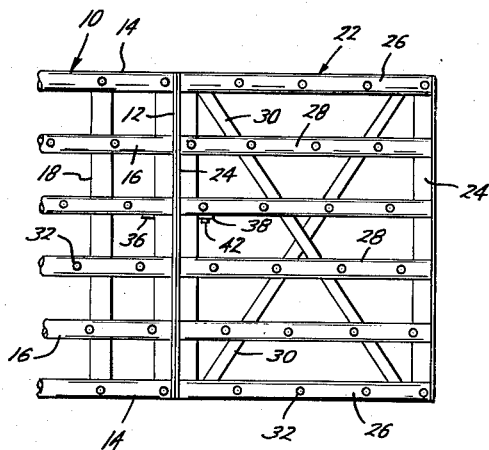
Jay C. Bland
INVENTOR.
BY
Charles E. Lightfoot
ATTORNEY

United States Patent Office 2,990,893
Patented July 4, 1961

2,990,893
LAND LEVELLING AND SMOOTHING HARROW
Jay C. Bland, 10422 E. Hardy St., Houston, Tex.
Filed Oct. 5, 1959, Ser. No. 844,564
1 Claim. (Cl. 172—456)

This invention relates to land levelling and smoothing apparatus and more particularly to a harrow which is adapted to be pulled by and operated from a tractor.

The invention finds particular utility in connection with the farming of land for the smoothing and levelling of the same prior to and after planting, and is also useful for many other purposes in the treatment and conditioning of land.

The invention has for an important object the provision of a harrow which is adapted to be detachably connected to a tractor to be drawn over the ground thereby and embodying means for allowing relative vertical movement between the tractor and harrow to permit the equipment to adjust itself for irregularities in the level of the ground.

Another object of the invention is to provide a harrow having a central, rectangularly shaped section adapted to be supported in a substantially horizontal position from a tractor, and side sections of rectangular shape hingedly connected to the central section for vertical swinging movement to inactive positions extending upwardly from the central section and to active positions in horizontal alignment therewith, and including releasable means for holding the sections against movement out of their horizontally aligned positions.

A further object of the invention is the provision of a harrow of the kind referred to including means for releasably holding the side sections either in their active or inactive positions.

Another object of the invention is to provide a harrow having a frame formed with a central section and side sections hingedly connected thereto for movement into and out of coplanar positions with the central section and means for supporting the central section from a tractor to permit the sections to be moved to elevated inactive positions for transportation and to substantially horizontal positions in engagement with the ground to perform the harrowing operation.

A further object of the invention is the provision of a harrow of simple design and rugged construction capable of long withstanding the extreme conditions of hard usage and exposure to which such devices are customarily subjected and which may be economically manufactured.

The above and other important objects and advantages of the invention may best be understood from the following detailed description, constituting a specification of the same, when considered in conjunction with the annexed drawings, wherein—

FIGURE 1 is a perspective view of the harrow of the invention showing the same with the central section and one side section in position to perform a harrowing operation and with the other side section in an inactive position and illustrating the manner in which the harrow is supported from a tractor;

FIGURE 2 is a rear end elevational view of the harrow with all of the sections in their active positions, ready for the performance of a harrowing operation;

FIGURE 3 is a view similar to that of FIGURE 2 showing the harrow with the side sections in inactive positions and the central section in position to perform a harrowing operation; and FIGURE 4 is a fragmentary bottom plan view of a portion of the central section and one of the side sections showing the relationship of the parts with the sections in active positions.

Referring now to the drawings in greater detail, the invention is illustrated herein in connection with its use with a tractor T of conventional construction, of the type which is provided with power lift mechanism M of the usual kind and having a frame structure F to which the harrow supporting means may be readily connected to support the harrow in a rearwardly extending position from the tractor.

The harrow of the invention comprises a central, preferably rectangular, frame section, generally designated 10, whose length is preferably somewhat greater than the overall distance apart of the wheels of the tractor T and of any convenient width. The central section 10 is made up of end frame members 12, of angular shape in cross-section and side frame members 14 which may be of tubular or other convenient cross-sectional shape. The end frame members 12 are connected together, mediate their ends by longitudinal ties 16 similar to the side frame members 14, and the side frame members and longitudinal ties are connected together mediate their ends by cross ties 18, which are preferably of angular shape in cross-section each having one flange 20 thereof extending away from the general plane of the section.

Side sections, of identical construction, generally indicated at 22 are provided, each of which is hingedly connected along one end thereof to the adjacent end of the central section. Each side section is similar in structure to the central section, having end frame members 24 of angle shape in cross section, and side frame members 26 of tubular shape, and being provided with tubular longitudinal ties 28. Diagonal braces 30 may also be provided on the side sections to reinforce and strengthen the same.

The side frame members and longitudinal ties of the central and side sections and provided with harrow teeth or spikes 32 whose points are positioned to penetrate the ground when the sections are in their active positions. The teeth or spikes 32 may be positioned in staggered relation in the direction of movement of the harrow along the ground, as best shown in FIGURE 4.

The side sections 22 are connected to the ends of the central section 10 by hinges, indicated at 34, to permit the side sections to swing into and out of coplanar relation with the central section, the hinges being attached to and extending somewhat angularly upwardly away from the upper flanges of the adjacent end frame members 12 and 24, so that the vertically positioned, downwardly extending flanges of these adjacent end frame members will be in contact when the side sections are in coplanar positions relative to the central section, so that the sections will be held by the engagement of these vertical flanges against downward swinging movement beyond such coplanar positions, as seeen in FIGURE 2.

Vertically upwardly extending plates 36 and 38 are provided on the central section and the side sections, the plate on each side section being positioned in overlapping relation to the adjacent plate on the central section and in facing contact therewith. The plates 36 and 38 are provided with suitable holes, such as that shown at 40 in FIGURE 1 positioned to be in registration when the side frames are positioned substantially at right angles to the central section and when the side sections are in coplanar positions relative to the central section, and through which pins 42 may be removably extended to hold the section against relative swinging movement.

Upwardly extending perforated lugs 46 and 48 are connected at longitudinally spaced locations to the cross members 20 for the connection thereto of suspension links 50, as by means of pins 52.

The central section 10 is supported by the links 50, of generally circular shape, on a support frame having laterally extending elements 54 and 56, preferably of tubular shape, connected together adjacent their opposite ends by longitudinal rearwardly extending parallel side elements 58. An upwardly extending, inverted, U-shaped element 60 is connected by its arms to the end element 56, and sloping braces 62 connect the bottom portion of the U to the end element 54.

The end element 56 is pivotally connected at its opposite ends to rearwardly extending portions of the frame F of the tractor T for rotation on the frame in a horizontally extending position and the bottom portion of the U 60 is connected to the power lift mechanism M of the tractor, as by means of lugs 64 on the U to which one end of a link of the power lift mechanism is pivotally attached.

The laterally extending elements 54 and 56 extend through pairs of the suspension links 50, as best seen in FIGURE 1, so that the central section is loosely suspended from the support frame to permit limited vertical movement of the harrow relative thereto. With the harrow thus supported it will be apparent that the power lift mechanism of the tractor may be operated to swing the support frame upwardly on the frame F to tilt the harrow upwardly to a vertical inactive position, or to swing the support frame downwardly to move the harrow to a substantially horizontal active position in engagement with the ground.

In making use of the equipment of the invention, constructed and arranged as described above, the central section 10 is moved into its horizontal, active position by swinging the support frame downwardly by operation of the power lift mechanism M and the side sections 22 are swung downwardly to their active, coplanar positions relative to the central section, in which they will be held by the pins 42 extending through registering holes of the plates 36 and 38. With the sections thus supported in their active positions, as best seen in FIGURE 2, the harrow is moved over the ground by the tractor to smooth and level the ground. In the event that the tractor should pass over some irregularity in the ground, such as a hollow, the links 50 will allow the harrow to remain in a substantially horizontal position and at the general level of the ground with which it is in contact. Moreover, should the harrow encounter a hump in the ground, it may move upwardly somewhat relative to the tractor to accommodate itself to such an irregularity.

Should it be desired to harrow a relatively narrow strip of ground, such as between rows of a crop, the side sections 22 may be swung upwardly to their inactive positions as shown in FIGURE 3 and held therein, so that the central section alone is in engagement with the ground.

When the equipment is to be moved from one location to another, between harrowing operations, the side sections may be moved to the inactive positions of FIGURE 3, and the support frame swung upwardly to move the central section into a substantially vertical position, whereupon the side sections will also be positioned vertically outwardly beyond the wheels of the tractor to form a compact and relatively narrow arrangement convenient for movement along a road, through gates and in other locations where the harrow could not be readily moved in its active position.

Because of the relatively great width of ground which may be conditioned with the side sections of the harrow extended, the invention is particularly useful in smoothing the ground preliminary to the operation of planter equipment for the purpose of removing previously formed wheel tracts, which often tend to confuse the operator and cause uneven planting of the rows. The harrow of the invention is likewise useful in smoothing the ground to remove previously formed drills made during planting and which may form depressions which interfere with the proper operation of moving or raking equipment.

It will thus be seen that the invention provides improved harrowing apparatus which is useful in many different ways, either before or after the planting of crops and which may also be used as a cultivator when desired.

The invention is disclosed herein in connection with a certain specific structure and arrangement of parts, but it will be understood that this is intended by way of illustration only and that various changes and modification can be made in the equipment within the spirit of the invention and the scope of the appended claims.

Having thus clearly shown and described the invention, what is claimed as new and desired to secure by Letters Patent is:

In a harrow, a rectangular central section, a supporting frame adapted to be mounted on a vehicle for vertical swinging movement, link means pivotally connected at their lower ends to said central section and shaped for coaction with the frame to cause the central section to move with the frame to one position in substantially parallel relation to the ground surface and to another position extending substantially vertically upwardly and to support the central section for vertical tilting movement relative to the frame when in said one position, rectangular side sections hingedly connected to the central section for swinging movement to active positions in coplanar relationship to and to inactive positions in angular relation to the planes of said central section and means for releasably holding the side sections against swinging movement relative to the central section when the side sections are in said active and said inactive positions.

References Cited in the file of this patent

UNITED STATES PATENTS

| | | |
|---|---|---|
| 1,563,261 | Curtis | Nov. 24, 1925 |
| 1,708,328 | Ring | Apr. 9, 1929 |
| 2,654,197 | Peterson | Oct. 6, 1953 |
| 2,655,854 | Warne | Oct. 20, 1953 |
| 2,688,283 | Love | Sept. 7, 1954 |
| 2,712,718 | Love | July 12, 1955 |
| 2,800,758 | Schmied | July 30, 1957 |

FOREIGN PATENTS

| | | |
|---|---|---|
| 1,176,046 | France | Nov. 17, 1958 |